(12) United States Patent
Selman et al.

(10) Patent No.: US 12,512,202 B2
(45) Date of Patent: Dec. 30, 2025

(54) ADMINISTRATION SYSTEMS AND METHODS FOR USING SAME

(71) Applicant: Ypsomed AG, Burgdorf (CH)

(72) Inventors: Hasan Selman, Biberist (CH); David Bosshard, Burgdorf (CH); Christian Krämer, Lueterkofen-Ichertswil (CH); Stefan Ebener, Bern (CH)

(73) Assignee: Ypsomed AG, Burgdorf (CH)

( * ) Notice: Subject to any disclaimer, the term of this patent is extended or adjusted under 35 U.S.C. 154(b) by 244 days.

(21) Appl. No.: 18/163,411

(22) Filed: Feb. 2, 2023

(65) Prior Publication Data

US 2023/0178205 A1    Jun. 8, 2023

Related U.S. Application Data

(63) Continuation of application No. PCT/EP2021/073390, filed on Aug. 24, 2021.

(30) Foreign Application Priority Data

Sep. 9, 2020 (CH) .................... 01123/20

(51) Int. Cl.
G16H 20/17      (2018.01)
G16H 40/67      (2018.01)

(52) U.S. Cl.
CPC ............. G16H 20/17 (2018.01); G16H 40/67 (2018.01)

(58) Field of Classification Search
CPC ................ G16H 20/17; G16H 40/67
See application file for complete search history.

(56) References Cited

U.S. PATENT DOCUMENTS

2007/0074722 A1*  4/2007  Giroux ............... A61M 11/06
                                                         128/203.15
2008/0059228 A1*  3/2008  Bossi ..................... G16H 30/20
                                                         705/2

(Continued)

FOREIGN PATENT DOCUMENTS

CH        716444 A2     1/2021
EP        3660856 A1 *  6/2020   ........ A61M 5/14248

(Continued)

OTHER PUBLICATIONS

Material Handling Industry, Data Identifier and Application Identifier Standard, Aug. 27, 2020, The American National Standards Institute (Year: 2020).*

(Continued)

*Primary Examiner* — Shahid Merchant
*Assistant Examiner* — David Choi
(74) *Attorney, Agent, or Firm* — Dorsey & Whitney LLP

(57) ABSTRACT

The invention relates to administration systems and to methods which can improve the safety of administration systems, more particularly the safety of an infusion system, in which system it is checked, when the medication container is exchanged, whether the new container is appropriate for the system. A system of this type consists of an administration device (1), a mobile communication device (3) and servers (5). When a reservoir (2) or the administration device (1) is replaced, an image of information (2a) is captured by means of a camera (3a) of the communication device (3). As a result of evaluation of the information (2a) by means of a software application, functions of the administration device (1) are activated or not.

18 Claims, 4 Drawing Sheets

(56) References Cited

U.S. PATENT DOCUMENTS

| | | | | |
|---|---|---|---|---|
| 2011/0213225 A1* | 9/2011 | Bernstein | ............... | G16H 40/63 |
| | | | | 600/309 |
| 2015/0161339 A1* | 6/2015 | Teucher | ................ | G16H 20/10 |
| | | | | 604/504 |
| 2017/0124285 A1* | 5/2017 | McCullough | .......... | G06Q 50/01 |
| 2018/0015218 A1 | 1/2018 | Welsch | | |
| 2019/0378603 A1 | 12/2019 | Cabiri et al. | | |

FOREIGN PATENT DOCUMENTS

| | | |
|---|---|---|
| WO | 2015127965 A1 | 9/2015 |
| WO | 2018064784 A1 | 4/2018 |
| WO | 2022053307 A1 | 3/2022 |

OTHER PUBLICATIONS

Digital Trends, How to use Google Lens: The Coolest App You Aren't Using, Jun. 18, 2019, YouTube (Year: 2019).*

International Preliminary Report on Patentability issued in International Application No. PCT/EP2021/073390 mailed on Mar. 7, 2023, 9 pages.

International Search Report and Written Opinion issued in International Patent Application No. PCT/EP2021/073390, mailed on Nov. 25, 2021, 16 pages including 2 pages of English translation.

* cited by examiner

ADMINISTRATION SYSTEMS AND METHODS FOR USING SAME

CROSS-REFERENCE TO RELATED APPLICATIONS

This application is a Continuation of International Patent Application No. PCT/EP2021/073390, filed Aug. 24, 2021, entitled "ADMINISTRATION SYSTEMS AND METHODS FOR USING SAME," which in turn claims priority to Swiss Patent Application No. 01123/20, filed Sep. 9, 2020, entitled "ADMINISTRATION SYSTEMS AND METHODS FOR USING SAME", each of which is incorporated by reference herein, in the entirety and for all purposes.

TECHNICAL FIELD

The present invention relates to the field of administration systems for administering fluid medicaments by means of an administration device, in particular an infusion pump or an injection device. Specifically, the present invention also relates to wireless communication within the administration systems and software functions in the administration systems.

BACKGROUND

Apparatuses for administering fluid medicaments are well known to the person skilled in the art from international patent class A61M5.

Due to the increasing health costs in developed countries, self-administration of fluid medicaments is becoming increasingly important, even if they must be injected or infused. Since most patients are not medical professionals, there is a risk of incorrect handling or incorrect use of incorrect medicaments.

A typical example is self-administration of insulin in the case of diabetes patients. Insulin is administered in syringes, injection pens or also with infusion pumps. There are many different insulins in different concentrations and different action profiles. A common primary packaging means of insulins in liquid formulation is the carpule, as either a 3 ml or a 1.6 ml version. Alternatively, there are prefabricated single-use pens, in which the corresponding insulin carpule is already installed.

On the one hand, this entails the risk that diabetes patients administer the wrong form with potentially serious consequences; if, for example, instead of the daily dose of slow-acting insulin (Sanofi Lantus), the same number of units of very fast-acting insulin (Novo Nordisk Fiasp®) is administered, hypoglycemia and a subsequent collapse of diabetes patients can occur.

On the other hand, patients should not be patronized and should be able to decide themselves which medicament they administer and when. The potential negative consequence of patronization is a decreasing adherence of patients to a certain therapy.

Furthermore, infusion pumps, in particular insulin pumps, are tested and approved for certain insulin products. In this case, there is the risk of imprecise dosage when a supposedly identical product is used in a carpule of supposedly the same size.

There is a need to further increase the safety during administration of fluid medicaments without patronizing patients, which would have a detrimental effect on adherence to therapy.

The term fluid "product," fluid "medicament," or fluid "medical substance" in the present context includes any flowable medical formulation which is suitable for controlled administration by means of a cannula or hollow needle into subcutaneous or intramuscular tissue, for example a liquid, a solution, a gel, or a fine suspension containing one or more active medical ingredients. A medicament can thus be a composition with a single active ingredient or a premixed or co-formulated composition with a plurality of active ingredients from a single container. The term includes in particular drugs, such as peptides (e.g., insulins, insulin-containing medicaments, GEP 1-containing preparations as well as derived or analogous preparations), proteins and hormones, biologically obtained or active ingredients, active ingredients based on hormones or genes, nutrient formulations, enzymes, and other substances both in solid (suspended) or liquid form. The term also includes polysaccharides, vaccines, DNA or RNA or oligonucleotides, antibodies or parts of antibodies as well as suitable base substances, excipients, and carrier substances.

SUMMARY

It is an object of the invention to provide administration systems at least consisting of a mobile communication device and an administration device, as well as associated methods, which provide the user with increased safety when using the system.

The object is achieved by the systems and methods defined in the independent claims. Advantageous developments can be found in the dependent claims, the description and the drawings.

In one embodiment of the invention, an administration system according to the invention for administering a fluid medicament consists at least of an administration device and a mobile communication device. The two devices can communicate with one another wirelessly and bi-directionally.

Software or in particular a software application, which comprises multiple functions serving the communication with and/or the control of the administration device, is installed on the communication device, which may, for example, be a smartphone, such as an iPhone. Multiple communication modules or appliances, which could be used by the software, are present in the communication device. These modules or appliances may, for example, be modules or appliances for mobile radio, WLAN, Bluetooth, NFC, ZigBee, Z-Wave and/or similar. The communication device further comprises a camera which can be addressed and controlled by the software. The communication device also comprises typical further elements, such as a user interface in the form of a screen and further operating elements, buttons, or a touch-sensitive screen, memory for storing data, and an electronic controller with at least one processor, an operating system and further optional elements, such as sensors.

The administration device comprises a reservoir with the medicament, which can be exchanged, and a dispensing apparatus. This means that, for administration of the medicament, medicament is administered from the reservoir with the aid of the dispensing apparatus. If the reservoir is empty, it can be replaced with a new full reservoir. Furthermore, the administration device has an electronic controller and a communication module or appliance connected, e.g., communicatively coupled, to the controller for wireless communication with the communication device. The possible technologies used here were mentioned above.

The reservoir can be a wide variety of forms known to the person skilled in the art of primary packaging forms for fluid medicaments; these may include, by way of example and non-exhaustively, pouches, bottles, cartridges, carpules, syringes or syringe-like reservoirs. According to the invention, information is arranged on an outer surface of the reservoir or its package.

This information can be read and evaluated by the software using the camera. According to the invention, this information can be used to activate, deactivate, or keep deactivated functions implemented in the software. These functions can serve the communication or the control of the administration device.

The information is advantageously read with the camera when the reservoir is changed. Alternatively, if multiple reservoirs are in one package, the reading can also take place when a new package is broken open. In a further alternative, the reading of the information can be time-controlled so that when the reservoir is changed, the information is read after a certain period, for example after one week or one month.

The information is advantageously designed to be easily machine-readable, for example as a barcode, data matrix code, QR code, machine-readable font, or machine-readable pattern.

The information may comprise various elements; the following elements are mentioned here by way of example and non-exhaustively:
- a unique product identifier,
- a batch number or a lot number,
- a serial number,
- an expiration date,
- a date of manufacture or production date,
- a manufacturer identifier.

In advantageous embodiments of the invention, the administration device can be an infusion pump, in particular an insulin pump, a patch pump, or an injection device. In the present description, the term "injection device" is understood to mean an apparatus with which the injection needle is removed from the tissue after a controlled amount of the medical substance has been delivered. Thus, with an injection device, the injection needle does not remain in the tissue for a longer time period of hours. This is in contrast to the infusion pump or the patch pump, with which the infusion cannula can remain in the tissue up to several days or even a week. With the traditional infusion pump, the infusion cannula is part of an external infusion set, and with the patch pump, the infusion cannula is part of a short infusion line, which is frequently arranged inside the patch pump, and only the cannula projects out of the housing into the tissue.

In further embodiments of the inventions, the information is designed as a standardized data matrix code or barcode, in particular according to ISO/IEC 15418 and/or ISO/IEC 16022. These are advantageously GS1 application identifications (https://www.g1.org/). These embodiments also advantageously comply with the Falsified Medicines Directive 2011/62/EU of the European Union or analogous specifications of US authorities, such as the FDA, or other official agencies.

In an advantageous embodiment, a data matrix code according to the invention, in particular a GS1 data matrix code, comprises a national or international item number (in particular a so-called NTIN or a GTIN), an expiration date, a batch number or a lot number and optionally a serial number. NTIN stands for "National Trade Item Number" and GTIN stands for "Global Trade Item Number."

Methods for enabling the mentioned functions of the software are also according to the invention.

In an embodiment of a method according to the invention, the information is by the camera, in particular when the reservoir is changed. The image information acquired by the camera is temporarily stored in the communication device. Subsequently, the information can be extracted from the image information by means of the processor and stored for further use by the software. In a further step, some or all of the information can be sent to a remote server via one of the communication modules or appliances of the communication device, in particular via mobile radio or WLAN. The term "server" should be interpreted broadly in the context of the present document. A server may be a virtual instance of a server farm or a private or public cloud service, or it may be a virtual instance of a single server or directly one or more servers, further possibilities being obvious to the person skilled in the art. In addition to the typical elements which distinguish a server computer, the server comprises a database which allows the information received by the server to be checked or compared. For this purpose, the database contains information on the activatable functions as well as reference information which can link the received information to the activatable functions. The check or comparison has the function of checking whether and/or which activatable function is compatible with the received information. After the server has performed a check, a response to the communication device with a result of the check is created or generated on the server and sent to the communication device. The software then evaluates the response. As a result, either none of the activatable functions, some of the activatable functions or all activatable functions of the multiple functions are enabled. Alternatively, one or more activatable functions of the multiple functions can also be deactivated or disabled. It can thus be ensured that only the activatable functions of the multiple functions that are also appropriate for the information are activated or enabled.

In an advantageous form of the embodiment of the method, the activatable functions that, according to the response, are appropriate for, in particular compatible with, the information are enabled from the multiple functions. In an advantageous embodiment, the response of the server contains a list of compatible activatable functions. Alternatively, such a list may also contain the incompatible activatable functions, and accordingly, the activatable functions that are not on the list are activated. In order to be able to keep the data quantity in the response as small as possible, the list can also be compressed or encoded; in particular, the list can be encoded by means of a hash function. Other variants of data quantity optimization are obvious to the person skilled in the art and do not deviate from the basic concept of the invention.

In an alternative embodiment of the method, which is a modification of the method described above and/or its developments, the check of the information does not take place on a remote server but on the communication device. In this alternative embodiment of the method, the database is held locally on the communication device. In an advantageous development of this method, the database is updated at regular or irregular time intervals via one of the communication modules or appliances of the communication device.

In a further alternative embodiment of the method, which is a modification of the alternative embodiment of the method, the check of the information takes place at least in part on the administration device.

In an advantageous development according to the invention of the above-described embodiments, the check can show that one of the activatable functions is not appropriate for the information, in particular is not compatible, as a result of which none of the activatable functions of the multiple functions is then activated or enabled in these developments.

In a further advantageous development, the communication device further comprises a real-time clock and a calendar connected thereto; if the information as described above now comprises an expiration date and/or a date of manufacture, the check can further comprise the check of the date, and the result can influence the activation of the activatable functions.

If it is determined that the expiration date has already been reached or exceeded (the medicament is deemed to have expired), the software can issue a message to the user interface, warning a user against using the medicament, and the safety of using the system can thus be improved. The expiration date may also be determined via the date of manufacture and a known maximum permissible storage duration.

As a further increase in safety, if a medicament has expired, the software can be used to send a control command to the administration device, with which the administration of the medicament is temporarily stopped or blocked. This is not intended to completely prevent the use of an expired medicament. The user can manually undo the blocking of the administration device. The user can do this, knowing that they will be using an expired medicament.

The activatable functions may be a wide range of the multiple functions of the software. In order to be able to use the administration system safely, the user should use only medicaments that have valid information. This is further explained below in the description of the figures. The range may have one or more of the following functions; the list is by no means exhaustive:

remote control function, in which the software transmits control commands to the administration device and the communication device can thus assume the role of a remote control:
  bolus programming and bolus command (that is to say, the dispensing of a single dose of the medicament), which can be an immediate bolus (which is delivered in a single release), a delayed bolus (which is delivered in multiple individual releases over a predefined duration), or a combination bolus (combination of an immediate bolus and a delayed bolus). The bolus is programmed in the software with respect to the delivery parameters and then sent to the administration device. The administration device receives and executes the command.
  start, stop, pause medicament delivery
  temporary reduction of medicament delivery
  change of operating parameters on the administration device (such as maximum daily dose or maximum dose size)
convenience functions in software, such as a bolus calculator that calculates a bolus recommendation on the basis of input values
automatic dose adjustment algorithms, if, for example, the administration system is a diabetes management system with a continuous glucometer, a communication device and an insulin administration device, and in which the communication device assumes the role of the closed-loop controller. In this case, the communication device receives data from the continuous glucometer and adjusts the insulin administration rate automatically on the basis of dose data and blood glucose data.

An alternative embodiment of the administration system is described below, wherein it is important to note that the methods described above can also be used according to the invention for this embodiment. Described below are primarily the differences from the first described embodiment of the system; otherwise, the disclosure also applies analogously to this alternative embodiment of the system.

In this alternative embodiment of the system, the administration device consists of an injection device and an additional module, referred to as add-on for short. The injection device and the add-on are detachably connected to one another operatively, in particular mechanically, during use. It is important that the add-on can be used in a staggered manner with multiple or also different injection devices. The injection device contains a medicament reservoir, which can be delivered by means of a dispensing apparatus which is likewise present. The injection device may be an injection pen, a so-called patch injector or a so-called autoinjector. Preferably, the injection device is a single-use device which is emptied via one or more dose deliveries and can subsequently be disposed of properly. The add-on is connected to the injection device before first use and is separated therefrom again after the last use, whereby the add-on is again ready for a new injection device.

In contrast to the first described embodiment of the system, the information in this alternative embodiment of the system is preferably applied to an outer surface of the injection device. Alternatively, the information can also be arranged on a package of several identical injection devices, for example on a pack of insulin pens. Alternatively, if the reservoir is connected to the injection device fixedly, i.e., if the reservoir and the injection device can only be separated destructively, the information can still be arranged on an outer surface of the reservoir. However, this requires that the information is still visible when the reservoir is attached to or installed in the injection device.

The add-on has an electronic controller and a communication module or appliance connected to the controller for wireless communication with the communication device. The add-on further comprises one or more sensors, which are connected to the controller. Thus, if the add-on is connected to the injection device, different states of the injection device can be detected and, for example, sent via the communication module or appliance to the communication device.

The add-on further comprises a housing which at least partially encloses the controller, the at least one sensor and the communication module or appliance. The housing preferably comprises a receptacle via which the injection device can be mechanically connected to the add-on. For example, an approximately cylindrical depression can be provided in the housing, into which depression an end of an injection pen or of an autoinjector can be inserted. As mentioned, the connection between the add-on and the injection device is preferably also mechanical, and appropriate holding elements can be provided on the injection device and/or on the add-on to prevent unintentional separation. In particular, these holding elements can be threaded elements or snap-in elements.

The methods according to the invention as described above function analogously or identically with this alternative embodiment of the system.

If an injection device is used up, it is separated from the add-on and a new injection device is inserted. Before, during or after the replacement, the information which belongs to the new injection device is acquired by the camera and checked as described below.

In a further modification of the first embodiment of the invention and the variants associated with the first embodiment, a further variant is described below (based on the above description). In this further variant, the administration device is an infusion pump, in particular an insulin pump. In this further variant, the reservoir is preferably a commercially available carpule onto which the information is printed. In this further variant, the information is only acquired by the camera when the reservoir is inserted into the infusion pump. In order for this to function, the infusion pump comprises a window through which the reservoir and the information on the reservoir are visible. The camera then acquires not only the information but also image information relating to the pump. The image information may, for example, comprise shape and/or color information of the infusion pump. With image recognition software which is installed on the communication device or on a server integrated in the system, the type of insulin pump can be recognized, for example. The image information obtained in this way from the image recognition can be used according to the invention together with the information to activate, deactivate, or keep deactivated functions implemented in the software. These functions can serve the communication or the control of the administration device. Conceivably and also according to the invention, information and image information can also be used to activate or deactivate separate functions. This further variant can be combined as desired with the above-described embodiments in ways accessible to the person skilled in the art, without departing from the concept of the invention.

In an alternative embodiment of this further variant, the image information can also contain codes or text which are arranged on the surface of the pump. These may be the serial number of the pump, for example.

BRIEF DESCRIPTION OF THE DRAWINGS

Preferred embodiments of the invention are described below in connection with the appended figures. These exemplary embodiments are intended to show basic possibilities of the invention and are in no way to be interpreted as limiting.

DETAILED DESCRIPTION

Figure 1:
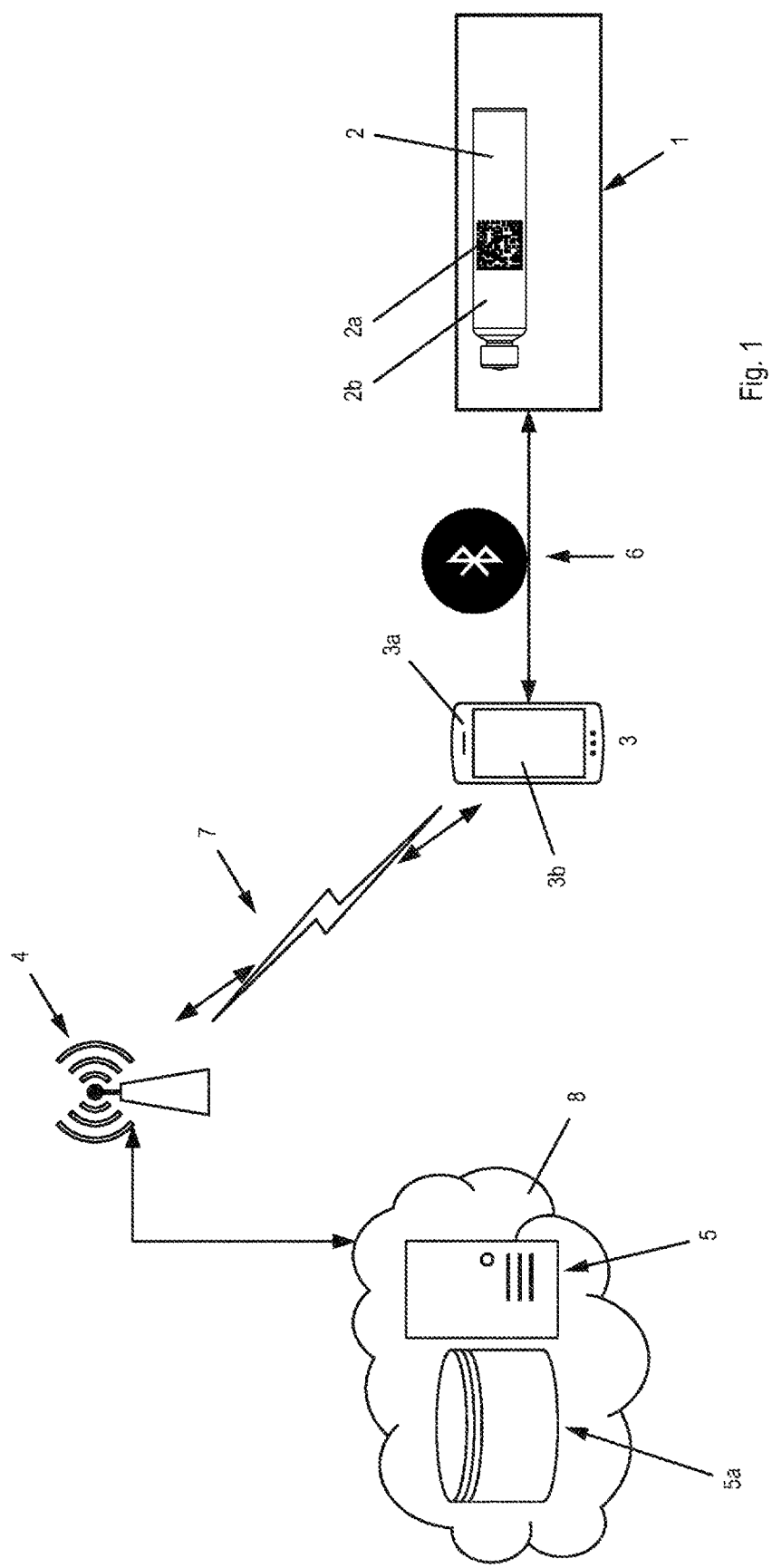
FIG. 1 shows an exemplary system according to the invention

A first administration system according to the invention is shown in FIG. 1. The administration device 1, which can in particular be an infusion pump, specifically an insulin pump 1, is shown schematically. Such pumps are well-known to the person skilled in the art in the form of the mylife Ypsopump from Ypsomed or the 670 G from Medtronic and therefore do not require a more detailed description. It is important that the administration device 1 can communicate bi-directionally with a mobile communication device 3, in particular a smartphone 3, via a radio link 6, specifically a Bluetooth link 6. The exchangeable reservoir 2 can be inserted into the administration device 1. As shown, the reservoir 2 can be in the form of a carpule, but other forms are possible, as mentioned. In this example, the information according to the invention is arranged in the form of a GS 1 data matrix code 2a on the outer surface 2b of the carpule 2. In this case, the data matrix code 2 can be printed directly onto the outer wall 2b, or be attached, in particular glued, to the outer wall 2b in the form of or as part of a label. Alternatively, it can enclose the circumference of the outer wall and be shrunk onto it, for example.

As usual in the case of smartphones, the smartphone 3 comprises one or more cameras on the front and/or rear side (symbolically reference sign 3a). An operating system, such as iOS or Android, is installed on the smartphone 3 and allows the installation and execution of the software application according to the invention. The smartphone has at least one Bluetooth module, for bidirectional communication with the administration device 1, and a WLAN and a mobile radio module in order to connect to a remote server 5 via the Internet and/or via mobile radio (both shown symbolically as a mobile radio tower 4). As mentioned, the server 5 can be designed in different variants. In the variant shown, it is part of a cloud service 8 and can be configured as a virtual server instance. Associated with the server is a database 5a, which either runs directly on the server 5 or can run on another server instance of the cloud 8.

Camera 3b of the smartphone 3 can be used to photograph the information of the reservoir when the reservoir is changed. In the present example, it is a standardized GS 1 data matrix code which contains various data relating to the medicament. The Global Trade Item Number (GTIN), which uniquely identifies the product (of course, alternative systems are possible, the identifier must simply be unique), a batch number, an expiration date and optionally a serial number and/or a manufacturer identifier. Further data could be added without any problems and would also be compliant with standards.

After being photographed, the data encoded in the data matrix code can be extracted from the photograph in the smartphone and evaluated. For this purpose, the operating systems iOS and Android provide functions which can be used by the software application. Alternatively, other, also separate, apps for data extraction can also be used, which transfer the extracted data to the software application after extraction.

The software application uses the data to check which functionality of the software application is compatible with the information present in the extracted data. The above-mentioned GTIN contained in the data uniquely identifies the product (can be checked at compendium.ch, for example); for example, the GTIN 7680553460037 clearly identifies Lantus from Sanofi in the concentration of 100 units/ml in 3 ml carpules (pack of 5). The same medicament in the same concentration in the same reservoir size but in the prefilled Solostar pen (pack of 5) has the GTIN 7680580440019. The fast-acting insulin Lispro from Eli Lilly in the same concentration also in 5×3 ml pack has the GTIN 7680535530369. While it is not likely that a carpule and a pen will be confused with one another, there is the risk of a patient using a Lispro (fast-acting insulin) instead of a Lantus carpule (slow-acting basal insulin).

If the information is now read with the smartphone 3 and the GTIN is isolated, the GTIN can be used to check whether the patient wishes to use the correct medicament in the administration device, in this case an insulin pump.

In the example, the software application of the smartphone 3 sends the extracted GTIN and, if need be, further information, to a remote server, which takes place via WLAN/Internet or mobile radio/Internet 7 and 4. The server 5 receives the GTIN and checks via the database whether it is an approved product and if so, which one. Remaining with the example of Lantus/Lispro, it may be that the insulin pump for Lispro from Eli Lilly is recommended and approved, while Lantus from Sanofi is not approved. If the GTIN now corresponds to Lispro from Lilly in the correct concentration and the correct container, the server can accordingly send a response via the Internet to the smartphone, which, for example, then enables the entire functionality of the software application. Conversely, if an invalid GTIN or an insulin not approved for the insulin pump is determined, the server can also convey this to the software application. The software application will then only enable a very rudimentary functionality. The software application advantageously displays a warning message on the display of the smartphone, notifying the patient of the problem. In a further consequence, the software application can send a control signal to the administration device, i.e., the insulin pump of the example, and temporarily block the latter. If the patient still wishes to use the medicament despite all the warning and temporary blocking, it should be possible to do so. Only a limited functionality is then available to the patient in the app; for example, the remote-control functionality may be deactivated. The patient can manually release the block on the pump.

It is important that the patient can deliberately override the system. It may, for example, be that there is a supply shortage of a certain approved medicament and for a short time, an alternative medicament must be used to treat a disease. Something like this must still be possible, but a situation in which an incorrect medicament is inadvertently used should be prevented.

The first system according to the invention from FIG. 1 can be varied without deviating from the concept of the invention. For example, it is conceivable that the software application on the smartphone stores the product references (e.g., the GTIN) of all approved products in an internal data storage, and the data storage is compared to the external server from time to time.

Another function which can increase safety is as follows: In addition to the product identifier, the batch number can also be compared to the server. If, for example, a batch has to be recalled and this information is stored on the server, then the server 5 can also store in its response that the medicament would be the correct one, but the batch should not be used. Advantageously, the software application can display a corresponding message on the display, e.g., user interface, of the smartphones 3, in particular together with instructions as to what the patient should do with the medicament (e.g., return it to the closest pharmacy).

As mentioned, it is advantageous if an expiration date is also stored in the information; the smartphone 3 can thus check, after the extraction of the information, via the internal clock and the calendar whether a medicament has already expired. If this is the case, various possibilities for consequences are again available: deactivation of functionality, message to patient via display, temporary blocking of the administration device.

Figure 2A:
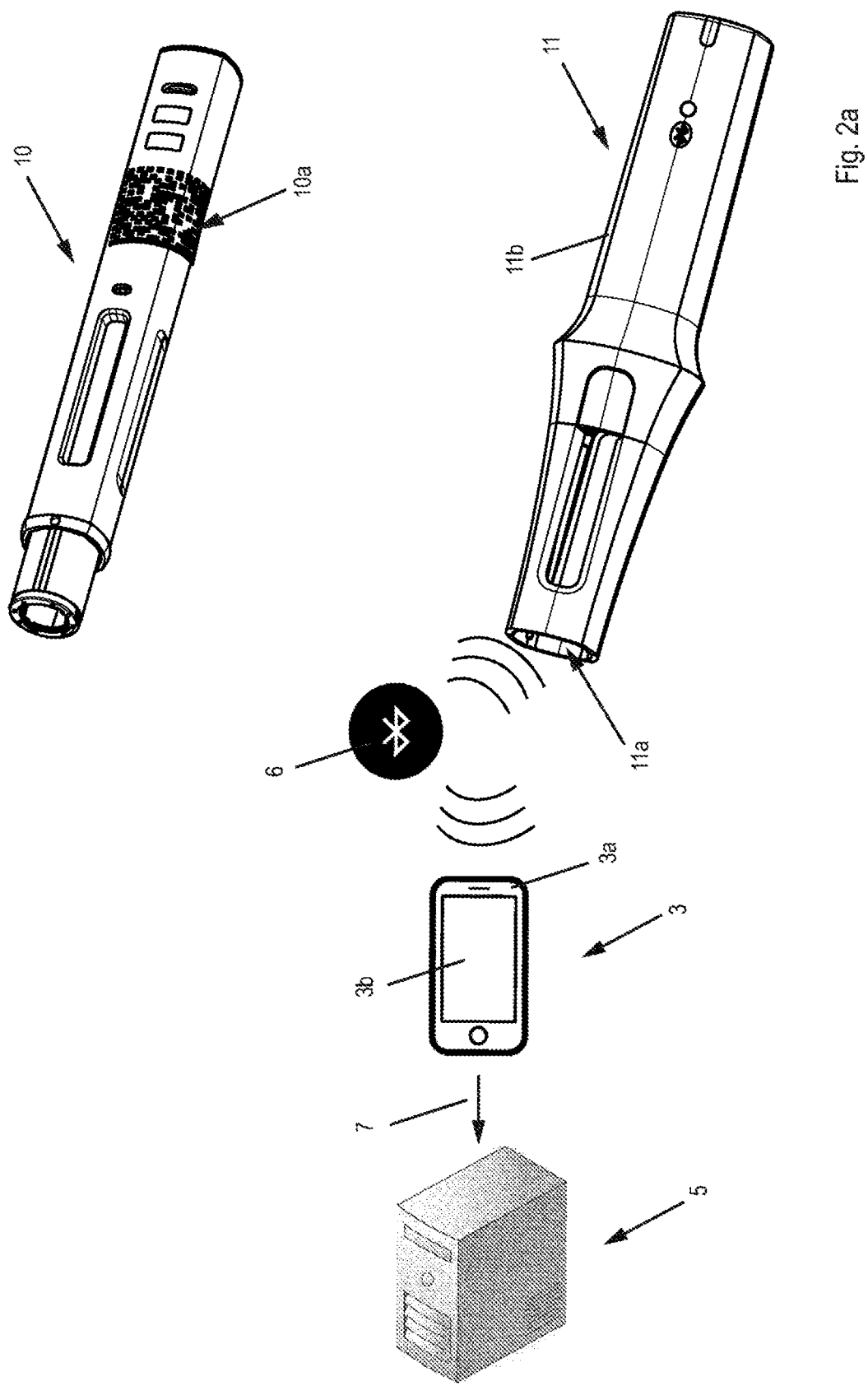
FIG. 2a shows a second exemplary system according to the invention
Figure 2B:
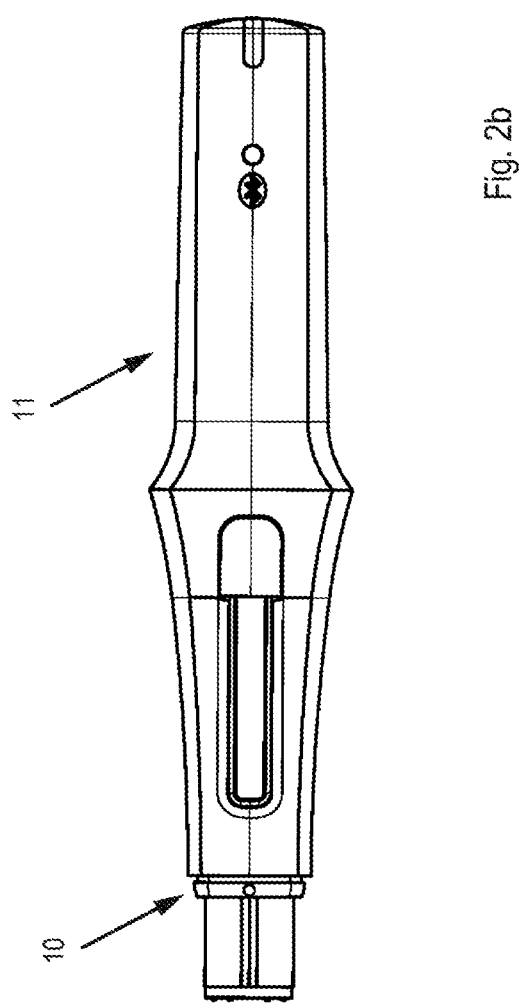
FIG. 2b shows add-on and injection device in an assembled state

A second system according to the invention is shown in FIGS. 2a and 2b. In this system, the administration device consists of two components, i.e., an add-on 11 and an injection device 10. The injection device shown is an autoinjector. The administration device consisting of the shown add-on and the autoinjector is described in detail in WO 2018064784 A1, which is hereby incorporated by reference into the present document in full.

The add-on 11 can be used multiple times, while the autoinjector 10 is designed for exactly one injection. The autoinjector 11 is thus exchanged after each administration. The add-on and the auto-injector are mechanically connected to one another for use. For this purpose, the autoinjector is inserted into the opening of the add-on 11. Advantageously, the autoinjector 10 is held in the add-on 11 via a mechanical snap mechanism.

The add-on 11 comprises an electronic controller and a wireless communication module or appliance connected thereto, in the present case Bluetooth. The electronic controller can communicate bi-directionally with the smartphone 3 via Bluetooth. The add-on further comprises sensors that serve to detect states in the autoinjector 10 when the add-on 11 and the autoinjector are assembled. With regard to details, reference is explicitly made to WO 2018064784 A1 cited above. The states may include, for example, the following states: "before injection," "during injection," "after injection." The detected states can then be forwarded to the smartphone 3. These states can be logged in the software application and used further, for example in order to display meaningful information about the use of the medicament, such as instructions, to the patient on the display of the smartphone.

The autoinjector 10 shown contains a reservoir with a fluid medicament and a dispensing apparatus which enables automatic injection and emptying of the reservoir after activation of the dispensing apparatus.

As is usual with autoinjectors, a standard 1 ml prefilled syringe serves as a reservoir. Alternatively, a 2.25 ml variant would also be possible. Since these are widely used standard forms of reservoirs, the same autoinjector 10 can be used for very different medicaments to be injected, for example for the treatment of rheumatoid arthritis or sexual dysfunction. Accordingly, it is important that there is no confusion.

Information, in the present example in the form of a GS 1 data matrix code 10a, is arranged on an outer surface of the autoinjector. As in the first described system, this GS 1 data matrix code 10a contains a unique identification of the medicament.

If the autoinjector 10 on the add-on 11 is now exchanged, a camera of the smartphone 3 can be used to read the GS 1 data matrix code 10a and to check the information analogously to the first described system. If the result of the check is positive, the software application can confirm the correct medicament on the display and instruct the patient further via the display, for example show how the autoinjector 10 is correctly inserted into the add-on. After the insertion, the software application can, in response to the states reported by the add-on 11, further instruct, confirm and log.

Further applications, such as checking the expiration date, are of course also possible and according to the invention in this system.

A third system according to the invention is a variant of the first described system according to the invention. Unless mentioned here, the third system is the same as the first. In order to keep the present document as compact as possible, FIG. 3 therefore shows only the administration device, namely the insulin pump 20, of the system. In a modification, the administration device 1 is an insulin pump 20; the reservoir 2 with the data matrix code 2a is now the reservoir 22 with the data matrix code 22a. The pump further comprises a touch display 23, an infusion set 24 (wherein only the infusion set adapter 24a and the hose 24b are shown), as well as the operating button 25. The pump 20 is a design of the Ypsopump, which can be operated via the touchscreen and operating button. The Ypsopump is described in detail in WO2015/127965A1. WO2015/127965A1 is hereby incorporated by reference into the present document in full.

Figure 3:
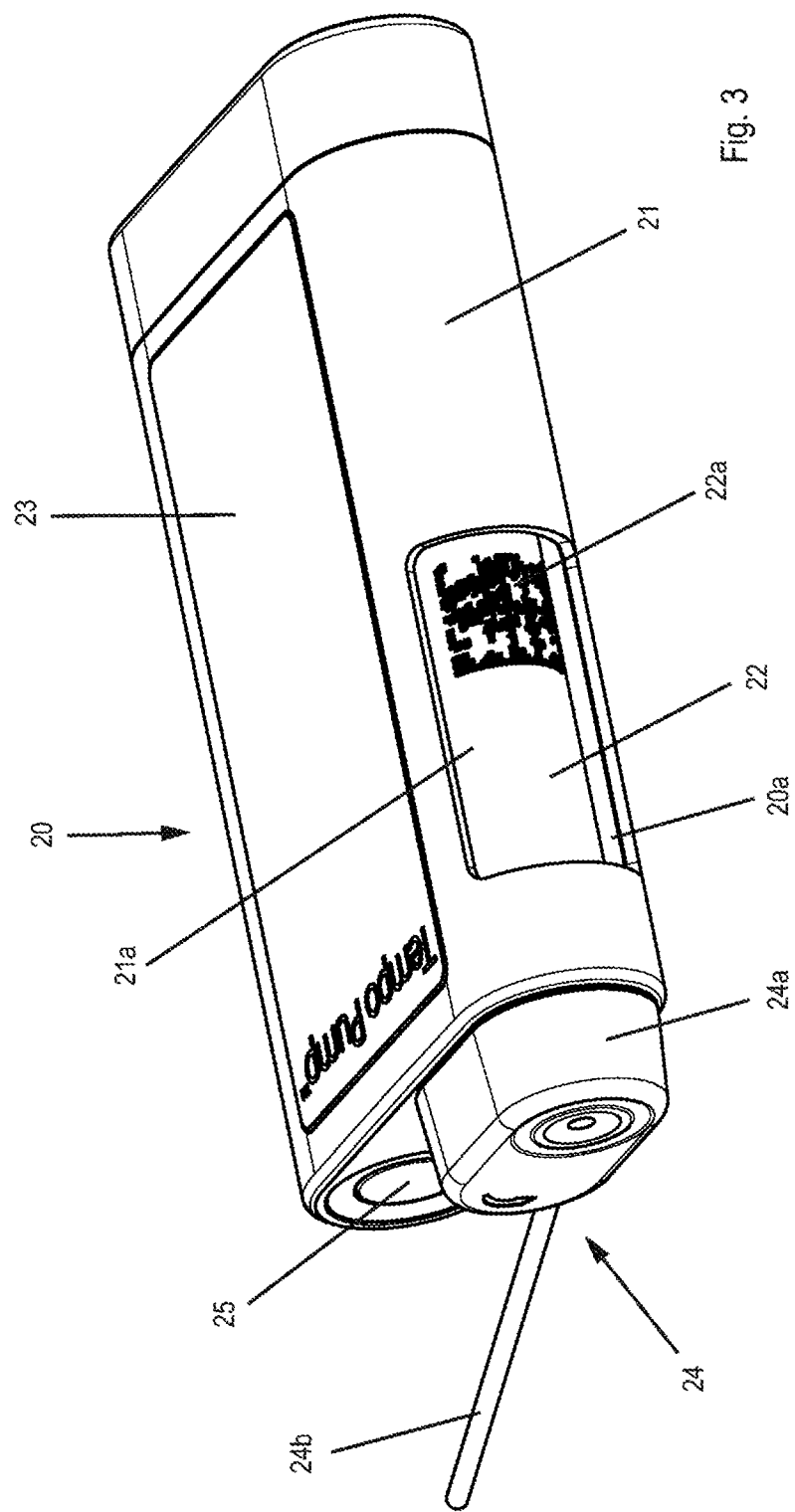
FIG. 3 shows a further example of an administration device according to the invention, which can alternatively be embedded in the system according to the invention of FIG. 1

The insulin pump 20 comprises a housing 21 with a window 21a. The window 21a can be designed as a transparent region of the housing 21. Alternatively, at the location of the window 21a, the housing 21 can comprise an opening into which a transparent piece of plastic or glass is inserted. The window 21a allows a view into the carpule compartment 20a of the pump 20. In FIG. 3, the carpule 22 is inserted into the pump 20. The carpule 22 with the data matrix code 22a is visible through the window 21a.

In a modification to the first system described, the data matrix code 22a is now only acquired using the smartphone camera 3a after the carpule 22 has been inserted into the pump 20. In this case, not only the data matrix code 22a is acquired, but also the entire pump 20. The further processing of the information from the data matrix code 22a proceeds analogously to the processing in the first system with all possible variants as described above.

The processing of the image information of the pump 20 is now added. According to the invention, via image recognition packages of Android (ML Kit or OpenCV) or iOS (AR Kit, Vision or OpenCV) on the smartphone 4, as are known and often available to the person skilled in the art, or on the server 5, for example by means of OpenCV, TensorFlow, PyTorch or Amazon Image Recognition, it is possible to detect whether the pump used is an approved infusion pump, for example the insulin pump. According to the invention, functionality can be activated or deactivated according to the recognized pump.

Further applications, such as checking the expiration date, are of course also possible and according to the invention in this system.

LIST OF REFERENCE SIGNS

1 Administration device
2 Reservoir
2a Data matrix code (information)
3 Smartphone (mobile communication device)
3a Camera (symbolic)
3b Display (screen)
4 Mobile radio network/Internet
5 Server
5a Database
6 Bluetooth link
7 WLAN or mobile radio link
8 Cloud
10 Autoinjector (injection device)
10a Data matrix code (information)
11 Add-on
11a Opening
20 Insulin pump
20a Carpules
21 Housing
21a Window in housing
22 Reservoir (carpule)
22a Data matrix code (information)
23 Touch-sensitive display (touch display)
24 Infusion set
24a Infusion set adapter
24b Infusion line
25 Operating button

What is claimed is:

1. An administration system for administering a fluid medicament, comprising an administration device configured as an infusion pump or an injection device, and a mobile communication device, wherein the administration device and the mobile communication device are capable of communicating wirelessly with one another bi-directionally, the mobile communication device comprising:
    an electronic controller comprising a processor and a memory;
    a first communication module communicatively coupled to the processor and the memory and configured to wirelessly communicate with the administration device;
    a second communication module communicatively coupled to the processor and the memory and configured to wirelessly communicate with remote servers;
    a software application, which is stored and can be executed in the memory of the mobile communication device and implements multiple functions for communication with the administration device and for control of the administration device;
    a camera communicatively coupled to the processor and the memory, wherein the software application is configured to acquire information from and control the camera; and a user interface configured to receive user input for controlling the software application; and the administration device comprising:
    an exchangeable reservoir for the fluid medicament to be administered, wherein machine-readable information is arranged on an outer surface or a package of the reservoir; an electronic controller and a wireless communication module comprising a processor and memory configured to be communicatively coupled to the electronic controller of the mobile communication device and configured for wireless and bi-directional communication with the mobile communication device;
    a dispensing apparatus controllable by the electronic controller of the mobile communication device and with which fluid medicament can be administered from the reservoir in individual doses, quasi-continuously or continuously via an infusion set or an injection needle; and
    a housing, which at least partially encloses the exchangeable reservoir, the electronic controller and wireless communication module, and the dispensing apparatus,
    wherein during exchange of the exchangeable reservoir, in which a used reservoir is removed and a new exchangeable reservoir is inserted, the machine-readable information on the outer surface of a new reservoir or the package thereof is configured to be read using the camera of the mobile communication device,
    wherein, based on the camera reading the machine-readable information of the new reservoir or package, the electronic controller of the mobile communication device extracts the machine-readable information and determines whether one or more activatable functions in a list of activatable functions are compatible with the extracted information,
    wherein the electronic controller of the mobile communication device determines from the extracted information whether the fluid medicament is correct for the administration device,
    wherein if the fluid medicament is determined to be correct in response to an approved national or international trade item number, the electronic controller of the mobile communication device activates at least one of the compatible activatable functions from the list of activatable functions, wherein the list of activatable functions comprises at least one of: remote control of the administration device, bolus control of the administration device, temporary reduction of medicament delivery from the administration device, change of operating parameters on the administration device, or automatic dosing of the of the fluid medicament in the administration device, and wherein if after the at least one compatible activatable function is activated and the fluid medicament is determined to be not correct after exchange of another new reservoir or package, the electronic controller of the mobile communication device deactivates the at least one activated compatible activatable function while permitting manual use of the administration device by a user.

2. The administration system according to claim 1, wherein the machine-readable information comprises at least one or more of: a unique product identifier, a batch number, a serial number, an expiration date, a date of manufacture, or a manufacturer identifier.

3. The administration system according to claim 1, wherein the administration device is an insulin pump.

4. The administration system according to claim 1, wherein the machine-readable information is in the form of a data matrix code according to ISO/IEC 15418:2016.

5. The administration system according to claim 4, wherein the machine-readable information in the data matrix code contains the following information: the national or international trade item number, an expiration date, a batch number, and optionally a serial number.

6. The administration system according to claim 1, further wherein the mobile communication device enables or disables the one or more of the multiple functions of the software application by:
transmitting at least a portion of the extracted information via the second communication module to a database of a remote server;
receiving a response from the remote server; and
enabling or disabling the one or more of the multiple functions of the software application on the mobile communication device based on the received response.

7. The administration system according to claim 6, wherein the received response comprises the list of activatable functions compatible with the transmitted extracted information.

8. The administration system according to claim 6, wherein, if one or more of the activatable functions is not compatible with the transmitted extracted information, none of the one or more of the multiple functions are enabled.

9. The administration system according to claim 1, wherein the mobile communication device further comprises a clock capable of rendering a current time, and a calendar capable of rendering a current date, and wherein the extracted information comprises at least one expiration date, and wherein the one or more of the multiple functions of the software application can be enabled or disabled by:
comparing the expiration date to the current date; and
enabling none of the one or more of the multiple functions to be enabled if the comparison reveals that the expiration date has already been reached or exceeded.

10. The administration system according to claim 9, wherein, if the comparison reveals that the expiration date has already been reached or exceeded, the software application outputs a message on the user interface, which makes the user aware that the expiration date has been reached and the one or more of the multiple functions to be enabled are therefore not enabled.

11. The administration system according to claim 9, wherein the administration device further comprises a user interface for controlling the administration device, and wherein, if the comparison reveals that the expiration date has already been reached or exceeded, the software application sends a deactivation command via the first communication module to the administration device, by means of which the administration device is temporarily deactivated, and the user must manually reactivate the administration device via the user interface of the administration device.

12. The administration system according to claim 1, wherein the mobile communication device enables or disables the one or more of the multiple functions of the software application by:
using the mobile communication device to generate image information and temporarily store the image information in the memory of the mobile communication device;
using the mobile communication device to extract the machine-readable information from the generated image information using the processor and temporarily store the extracted information in the memory of the mobile communication device;
using the second communication module to transmit at least a portion of the extracted information to and receive a response from a remote server, the response based on the transmitted extracted information and comprising information regarding the activatable functions; and
using the mobile communication device to enable or disable the one or more of the multiple functions of the software application on the mobile communication device based on the received response.

13. The administration system according to claim 1, wherein the administration device is an infusion pump, wherein the software application of the mobile communication device is configured cause the camera to acquire image information regarding an appearance and a shape of the infusion pump, wherein the image information can be processed either on the mobile communication device or on the remote servers, and a result of the processing the image information influences the ability of the multiple functions of the software application of the mobile communication device to be enabled or disabled by reading and evaluating the machine-readable information.

14. An administration system for administering a fluid medicament, comprising an add-on with an exchangeable injection device and a mobile communication device, wherein the add-on and the mobile communication device are capable of communicating wirelessly with one another bi-directionally, the mobile communication device comprising:
an electronic controller comprising a processor and a memory;
a first communication module communicatively coupled to the processor and the memory and configured to wireless communication with the add-on;
a second communication module communicatively coupled to the processor and the memory and configured to wirelessly communicate with remote servers;
a software application, which is stored and can be executed in the memory of the mobile communication device and implements multiple functions for communication with the add-on and control of the add-on;

a camera communicatively coupled to the processor and the memory, wherein the software application is configured to acquire information from and control the camera; and a user interface configured to receive user input for interacting with the software application, the exchangeable injection device comprising:

a reservoir with the fluid medicament, which can be emptied for administration thereof;

a housing comprising an outer surface, wherein machine-readable information is arranged on the outer surface or a package of the injection device; and a dispensing apparatus, with which fluid medicament can be administered from the reservoir in individual doses via an administration line; and the add-on comprising:

an electronic controller and a wireless communication module configured to be communicatively coupled to the electronic controller of the mobile communication device for wireless and bi-directional communication with the mobile communication device;

at least one sensor, which is communicatively coupled to the electronic controller and wireless communication module and with which at least one state of the injection device can be detected when the injection device and the add-on are connected to one another, wherein the electronic controller and wireless communication module is configured to send the at least one detected state to the mobile communication device; and an add-on housing which at least partially encloses the exchangeable injection device and the electronic controller and wireless communication module, wherein the add-on housing at least partially encloses the housing of the injection device when the add-on and the injection device are connected to one another in a mechanically detachable manner, wherein during exchange of the injection device, in which a used injection device is removed and a new injection device is inserted, the machine-readable information on the new injection device or the package thereof is configured to be read using the camera of the mobile communication device, wherein, based on the camera reading the machine-readable information of the new injection device or package, the electronic controller of the mobile communication device extracts the machine-readable information and determines whether one or more activatable functions in a list of activatable functions are compatible with the extracted information, wherein the electronic controller of the mobile communication device determines from the extracted information whether the fluid medicament is correct for the exchangeable injection device, wherein if the fluid medicament is determined to be correct, in response to an approved national or international trade item number, the electronic controller of the mobile communication device activates at least one of the compatible activatable functions from the list of activatable functions, wherein the list of activatable functions comprises at least one of: remote control of the exchangeable injection device, bolus control of the exchangeable injection device, temporary reduction of medicament delivery from the exchangeable injection device, change of operating parameters on the exchangeable injection device, or automatic dosing of the of the fluid medicament in the exchangeable injection device, and wherein if after the at least one compatible activatable function is activated and the fluid medicament is determined to be not correct after exchange of another new injection device, the electronic controller of the mobile communication device deactivates the at least one activated compatible activatable function while permitting manual use of the exchangeable injection device by a user.

15. The administration system according to claim 1, wherein the one or more of the multiple functions of the software application of the mobile communication device for the control of the administration device are caused to be disabled by the mobile communication device in response to the camera reading the machine-readable information corresponding to expiration of the medicament.

16. The administration system according to claim 14, wherein the one or more of the multiple functions of the software application of the mobile communication device for the control of the add-on are caused to be disabled by the mobile communication device in response to the camera reading the machine-readable information corresponding to expiration of the medicament.

17. The administration system according to claim 1, wherein if the electronic controller of the mobile communication device determines the fluid medicament is not correct, the software application causes a warning message to be displayed on the user interface of the mobile communication device.

18. The administration system according to claim 1, wherein one of the compatible activatable functions comprises the automatic dosing of the of the fluid medicament in the administration device.

* * * * *